Feb. 28, 1933.  E. GRIGIS  1,899,755
WELDED TANK CONSTRUCTION
Filed Feb. 1, 1929

Inventor
Eric Grigis.
By Hardway Tathey
Attorneys

Patented Feb. 28, 1933

1,899,755

UNITED STATES PATENT OFFICE

ERIC GRIGIS, OF HOUSTON, TEXAS

WELDED TANK CONSTRUCTION

Application filed February 1, 1929. Serial No. 336,799.

This invention relates to new and useful improvements in a welded tank construction.

One object of the invention resides in the provision of a tank of the character described whose parts are secured together in a novel and substantial manner to the end that the tank will be very strong, and will not leak, and so that the parts may be readily separated without substantial injury when it is desired to dismember the tank and re-erect the same.

Another object of the invention resides in a novel method of erecting a tank. The tank herein described is specially adapted for the storage of oil or for other storage purposes.

With the above and other objects in view the invention has particular relation to certain novel features of construction, arrangement of parts and method of erection, an example of which is given in this specification and illustrated in the accompanying drawing, wherein:—

Figure 1:
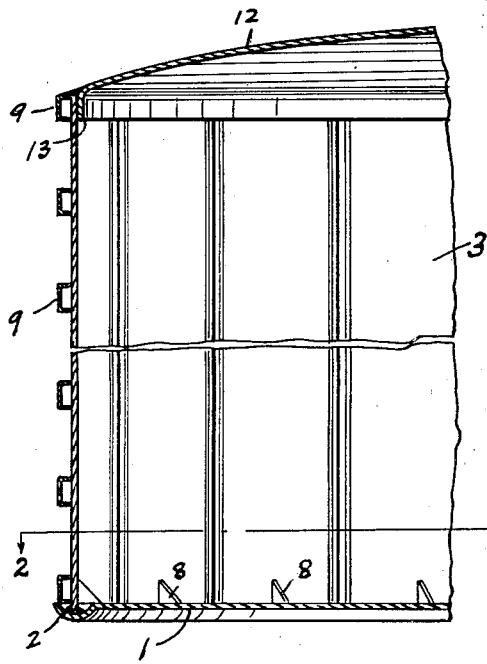
Figure 1 shows a fragmentary vertical sectional view of the tank.
Figure 3:
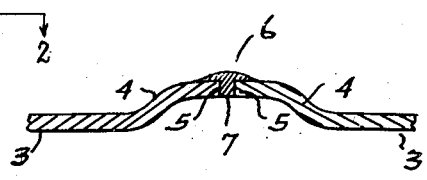
Figure 3 shows an enlarged fragmentary sectional view also taken on the line 2—2 of Figure 1.
Figure 2:
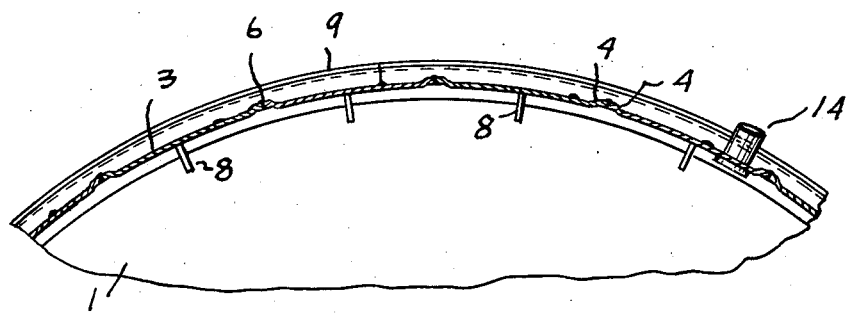
Figure 2 shows a fragmentary horizontal sectional view taken on the line 2—2 of Figure 1.

Referring now more particularly to the drawing, wherein like numerals of reference designate similar parts in each of the figures the numeral 1 designates the bottom of the tank preferably of sheet metal, and circular in form.

This bottom has the marginal groove 2, in its upper side. The walls of the tank are formed of the upright plates 3, preferably formed of sheet metal slightly arcuate in cross sectional contour. These plates are erected upright with their lower ends seated in the groove 2. The adjacent edges of the plates 3, are offset outwardly as at 4 and the free edges 5 of said offset portions confront each other and are spaced apart. Strips of bronze or other similar material 6 are disposed to break the joints between the spaced edges 5 and are formed with ribs 7 which fit between said spaced edges. These strips 6 extend from the upper to the lower end of the plates 3 and are brazed to the adjacent edges of said plates.

The lower ends of the plates 3 are welded or brazed both on their inner and outer sides to the bottom 1 and gussets 8 are brazed to the inner side of the lower end of each plate 3 said gussets resting on and being welded or brazed to the bottom 1. These gussets brace the tank wall against extraordinary pressures or strains. Hoops 9, preferably of channel iron, are formed around the tank and spaced apart from top to bottom. A dome like cover 12 is mounted on the tank with its margin 13 downwardly turned and fitted into the upper end of the tank. The margin of the cover and the upper end of the tank and the upper hoops may be brazed or welded together in one operation.

The tank may be filled or emptied through a suitable hose or pipe connection 14 at the bottom of the tank.

When it is desired to dismember the tank the brazing may be removed and the hoops 9 then released. The torch may then be used for removing the strips 6 as well as for separating the top 12 and upper hoop 9 from the tank walls and for separating the lower ends of the plates 3 from the bottom 1. The tank may thus be dismembered without substantial injury to the parts thereof and said parts may be then reassembled and re-erected into another tank.

In case of contraction or expansion of the tank when erected the offset portions 4 will yield to permit such expansion and contraction without disrupting the brazed joints connecting the margins of said plates.

It is important that the welded joint be in alignment so that as additional plates of the tank are added and welded to the adjacent plate it will allow each individual plate to expand and contract without buckling or distortion.

It is obvious that mechanical changes may be made in the structure and equivalents substituted for the parts shown without depart-

What I claim is:—

1. A tank including a bottom having a marginal groove in its upper side, vertical wall plates erected on said bottom with their lower ends in said groove, the adjacent vertical edges of said wall plates being offset and the offset margins confronting and being spaced apart, the lower ends of said plates being welded to said bottom and the offset margins of said plates being brazed together, a covering mounted on, and whose margin is secured to the upper ends of the wall plates and angle braces inside the tank at the bottom of the wall plates, said angle braces being welded to the tank bottom as well as to the inner sides of the wall plates.

2. A tank including a bottom having a marginal groove in its upper side, wall plates erected on the bottom with their lower ends in said groove, said lower ends being welded, on both sides, to said bottom and the vertical margins of said plates being offset, the free edges of said offset portions confronting and being spaced apart, strips of metal disposed to break the joints between said spaced edges, said strips being brazed to the adjacent offset edges, a covering mounted on the tank whose margin is welded to the upper ends of the wall plates, hoops around the tank spaced apart from top to bottom, the upper hoop being welded to the upper ends of said plates and the cover, and the lower hoop being welded to the lower ends of said plates and to the bottom.

3. A tank having a bottom, vertical wall plates erected on the bottom, the adjacent vertical edges of the plates being offset outwardly and the free edges of said offset portions confronting each other and being spaced apart, a strip of fusible metal between said spaced edges and welded thereto.

4. A tank of the character described including a bottom, upright wall plates mounted on and secured to said bottom and disposed to form an enclosing wall, the adjacent vertical edges of said plates being offset outwardly and the free margins of said offset portions being turned into confronting relation with each other and being welded together, whereby the said outwardly offset portions may yield upon the circumferential expansion or contraction of the tank.

In testimony whereof I have signed my name to this specification.

ERIC GRIGIS.